(12) United States Patent
Watanabe

(10) Patent No.: US 11,268,598 B2
(45) Date of Patent: *Mar. 8, 2022

(54) TENSIONER

(71) Applicant: TSUBAKIMOTO CHAIN CO., Osaka (JP)

(72) Inventor: Masanori Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 397 days.

This patent is subject to a terminal disclaimer.

(21) Appl. No.: 16/279,405

(22) Filed: Feb. 19, 2019

(65) Prior Publication Data

US 2019/0257392 A1 Aug. 22, 2019

(30) Foreign Application Priority Data

Feb. 21, 2018 (JP) .............................. JP2018-028575

(51) Int. Cl.
*F16H 7/08* (2006.01)

(52) U.S. Cl.
CPC ... *F16H 7/0848* (2013.01); *F16H 2007/0806* (2013.01); *F16H 2007/0814* (2013.01); *F16H 2007/0859* (2013.01)

(58) Field of Classification Search
CPC .. F16H 7/08; F16H 7/0848; F16H 2007/0806; F16H 2007/0812; F16H 2007/0814; F16H 2007/0859; F16H 2007/0893
See application file for complete search history.

(56) References Cited

U.S. PATENT DOCUMENTS

| 4,874,352 A * | 10/1989 | Suzuki | F16H 7/0848 474/110 |
| 6,398,682 B1 | 6/2002 | Suzuki et al. | |
| 6,609,987 B1 * | 8/2003 | Beardmore | F01L 1/02 474/111 |
| 2003/0070717 A1 * | 4/2003 | Hashimoto | F16H 7/0848 137/825 |

(Continued)

FOREIGN PATENT DOCUMENTS

| JP | H07-41113 U | 7/1995 |
| JP | 2001-12569 A | 1/2001 |

*Primary Examiner* — Michael R Mansen
*Assistant Examiner* — Juan J Campos, Jr.
(74) *Attorney, Agent, or Firm* — Westerman, Hattori, Daniels & Adrian, LLP

(57) ABSTRACT

Provided is a tensioner capable of stabilizing an oil pressure in an oil pressurizing chamber. The tensioner includes a pressure adjustment unit. The pressure adjustment unit includes a unit case attached to the housing or the plunger, a moving member disposed in the case inner space to be capable of moving closer to and farther away from the oil pressurizing chamber, and a pressure adjustment biasing unit which biases the moving member toward the oil pressurizing chamber. A gap between an inner wall of the case inner space and the moving member is configured to be held in a liquid tight state at any position between a position where the moving member is closest to the oil pressurizing chamber as a result of moving and a position where the moving member is most distant from the oil pressurizing chamber.

5 Claims, 6 Drawing Sheets

(56) References Cited

U.S. PATENT DOCUMENTS

| | | | | |
|---|---|---|---|---|
| 2009/0258737 A1* | 10/2009 | Muguruma | ........... | F16H 7/0848 474/111 |
| 2011/0256970 A1* | 10/2011 | Nakano | ................ | F16H 7/0836 474/110 |
| 2018/0274638 A1* | 9/2018 | Watanabe | ............. | F16H 7/0848 |
| 2019/0257390 A1* | 8/2019 | Watanabe | ............. | F16H 7/0848 |

* cited by examiner

TENSIONER

BACKGROUND OF THE INVENTION

1. Field of the Invention

The present invention relates to a tensioner which gives an appropriate tension to a traveling chain, belt, or the like.

2. Description of the Related Art

Conventionally, a tensioner has been used commonly to allow a chain or the like to retain an appropriate tension. For example, a known tensioner is used in a chain guide mechanism which uses a tensioner lever to slidably guide a transmission chain such as a roller chain endlessly wound between respective sprockets provided around a crank shaft and a camshaft in an engine. To allow a chain or the like to retain an appropriate tension, the chain guide mechanism uses the tensioner to bias the tensioner lever.

As a known tensioner used in such a chain guide mechanism, a tensioner 510 is known which includes a plunger 520 having a plunger hole 521 that is rearwardly opened, a housing 530 having a plunger container hole 531 that is forwardly opened to contain the plunger 520, a relief mechanism which releases oil in an oil pressurizing chamber 511 to the outside of the plunger 520 when an oil pressure in the oil pressurizing chamber 511 is increased, and a main spring 540 extensively contained in the oil pressurizing chamber 511 formed between the plunger 520 and the plunger container hole 531 to forwardly bias the plunger 520 (see Japanese Patent Application Publication No. 2001-12569), as shown in FIG. 6.

In the tensioner 510 described in Japanese Patent Application Publication No. 2001-12569, in the bottom section of the plunger 520, a pressure path 524 communicating with the oil pressurizing chamber 511, an outlet port 523 providing communication between the pressure path 524 and the outside of the plunger 520, and a spring container chamber 512 formed on the front side the pressure path 524 are formed. On the other hand, the relief mechanism includes a valve body 560 slidably inserted in the pressure path 524 and a relief spring 552 disposed in the spring container chamber 512 to bias the valve body 560 toward the oil pressurizing chamber 511.

In the tensioner 510, when the oil pressure in the oil pressurizing chamber 511 is increased, the valve body 560 forwardly moves against the biasing force of the relief spring 552 so that the pressure path 524 communicates with the outlet port 523 to allow the oil to be released from the outlet port 523.

SUMMARY OF THE INVENTION

However, in the tensioner 510 shown above, due to fluctuations in the force received by the plunger 520 from the chain side, fluctuations in an amount of the oil supplied to the oil pressurizing chamber 511, or the like, the oil pressure in the oil pressurizing chamber 511 may significantly vary. In this case, the tensioner 510 described in Japanese Patent Application Publication No. 2001-12569 is only allowed to be in two states, i.e., the state where the valve body 560 clogs the pressure path 524 to inhibit the oil from flowing to the outside of the plunger 520 and the state where the valve body 560 has forwardly moved under the oil pressure in the oil pressurizing chamber 511 to allow the oil to flow to the outside of the plunger 520 from the outlet port 523. As a result, a problem arises in that the oil pressure in the oil pressurizing chamber 511 is hard to stabilize.

When such a relief mechanism as described in Japanese Patent Application Publication No. 2001-12569 is provided and the oil pressure in the oil pressurizing chamber 511 is increased, the oil supplied from an oil pressure generation source such as an oil pump is partly released to the outside. Consequently, a problem also arises in that an amount of oil consumption is increased and the power of the oil pressure generation source needs to be increased.

The present invention is intended to solve such problems and an object of the present invention is to provide a tensioner having a simple configuration and capable of stabilizing an oil pressure in an oil pressurizing chamber.

The present invention is a tensioner including a plunger having a plunger hole that is rearwardly opened, a housing having a plunger container hole that is forwardly opened to contain the plunger, a main biasing unit which forwardly biases the plunger, and a pressure adjustment unit which adjusts an oil pressure in an oil pressurizing chamber formed between the plunger and the plunger container hole. The tensioner according to the present invention solves the foregoing problems by being configured such that the pressure adjustment unit includes a unit case attached to the housing or the plunger and having a case inner space communicating with the oil pressurizing chamber, a moving member disposed in the case inner space to be capable of moving closer to and farther away from the oil pressurizing chamber, and a pressure adjustment biasing unit that biases the moving member toward the oil pressurizing chamber, and a gap between an inner wall of the case inner space and the moving member is configured to be held in a liquid tight state at any position between a position where the moving member is closest to the oil pressurizing chamber as a result of moving and a position where the moving member is most distant from the oil pressurizing chamber.

In accordance with an aspect of the present invention, the pressure adjustment unit which adjusts the oil pressure in the oil pressurizing chamber includes the unit case attached to the housing or the plunger and having the case inner space communicating with the oil pressurizing chamber and the moving member disposed in the case inner space to be capable of moving closer to and farther away from the oil pressurizing chamber. The gap between the inner wall of the case inner space and the moving member is configured to be held in the liquid tight state at any position between the position where the moving member is closest to the oil pressurizing chamber as a result of moving and the position where the moving member is most distant from the oil pressurizing chamber.

Accordingly, when the oil pressure in the oil pressurizing chamber exceeds a given value, the moving member moves in a direction away from the oil pressurizing chamber. This increases a capacity of the oil pressurizing chamber in accordance with an amount of the movement of the moving member and can gradually reduce a pressing force of the plunger exerted on a chain. Therefore, it is possible to stabilize the oil pressure in the oil pressurizing chamber as well as the pressing force of the plunger using a simple configuration.

In addition, unlike in an existing tensioner provided with a relief mechanism, it is possible to prevent oil from being partly released to the outside. This can reduce an amount of oil consumption and reduce the size of a power of an oil pressure generation source. In addition, it is also possible to prevent oil in the oil pressurizing chamber from gradually leaking to the outside at the time of engine stop when a supply of the oil to the tensioner stops. Therefore, it is possible to maintain the amount of the oil in the oil pressurizing chamber for a long period of time and prevent the occurrence of trouble such as the occurrence of abnormal noise at the time of re-operation of the engine.

Moreover, by configuring the pressure adjustment unit separate from the housing and the plunger, the need to consider influence on the basic function of the tensioner is reduced and restrictions on the design of the unit case and the moving member, such as the materials and sizes thereof, are reduced. Accordingly, it is possible to easily increase a change in the capacity of the oil pressurizing chamber resulting from the movement of the moving member and improve a pressure adjusting function such as the ability to accurately and easily maintain the liquid tight state between the unit case and the moving member. During the assembly of the tensioner, it is sufficient to attach the pressure adjustment unit to the housing or the plunger. This can reduce the burden of assembling the tensioner and facilitates a change in the design of the pressure adjustment unit and the adjustment thereof.

In accordance with another aspect of the present invention, a piston section of the moving member is slidably disposed in a cylinder section formed in the unit case. This allows a change in the capacity of the oil pressurizing chamber to be easily increased in accordance with the amount of the movement of the moving member using a simple configuration. In addition, the liquid tight state between the cylinder section and the piston section can easily and accurately be maintained.

In accordance with still another aspect of the present invention, the pressure adjustment unit has a movement restricting section which restricts movement of the moving member toward the oil pressurizing chamber. This can not only limit the movement range of the moving member and allow the capacity of the oil pressurizing chamber to be precisely set, but also use the movement restricting section as a portion for aligning the moving member during assembly. As a result, the assembly burden can be reduced.

In accordance with yet another aspect of the present invention, the housing has a unit opening extending from the plunger container hole to an outer wall of the housing through the housing, and the unit case is attached to the housing such that the case inner space communicates with the oil pressurizing chamber through the unit opening. This allows the unit case to be easily attached firmly to the housing. As a result, it is possible to reliably prevent the oil from leaking out from the attachment section between the unit case and the housing. In addition, since the pressure adjustment unit can be attached to the housing even after assembly of various components such as the plunger to the housing, it is possible to suppress an increase in the burden of assembling the tensioner.

In accordance with still another aspect of the present invention, the plunger has a unit opening extending from the plunger hole to an outer wall of the plunger through the plunger, and the unit case is attached to the plunger with at least one portion thereof being inserted in the plunger hole from the unit opening. As a result, the pressure adjustment unit can also be attached to the plunger even after assembly of various components such as the plunger to the housing. Consequently, it is possible to suppress an increase in the burden of assembling the tensioner. In addition, since the capacity of the oil pressurizing chamber can be reduced by inserting at least one portion of the unit case in the plunger hole, the amount of the oil required to fill the oil pressurizing chamber can be reduced.

DESCRIPTION OF THE PREFERRED EMBODIMENTS

The following will describe a tensioner 10 according to a first embodiment of the present invention on the basis of the drawings.

Figure 1:
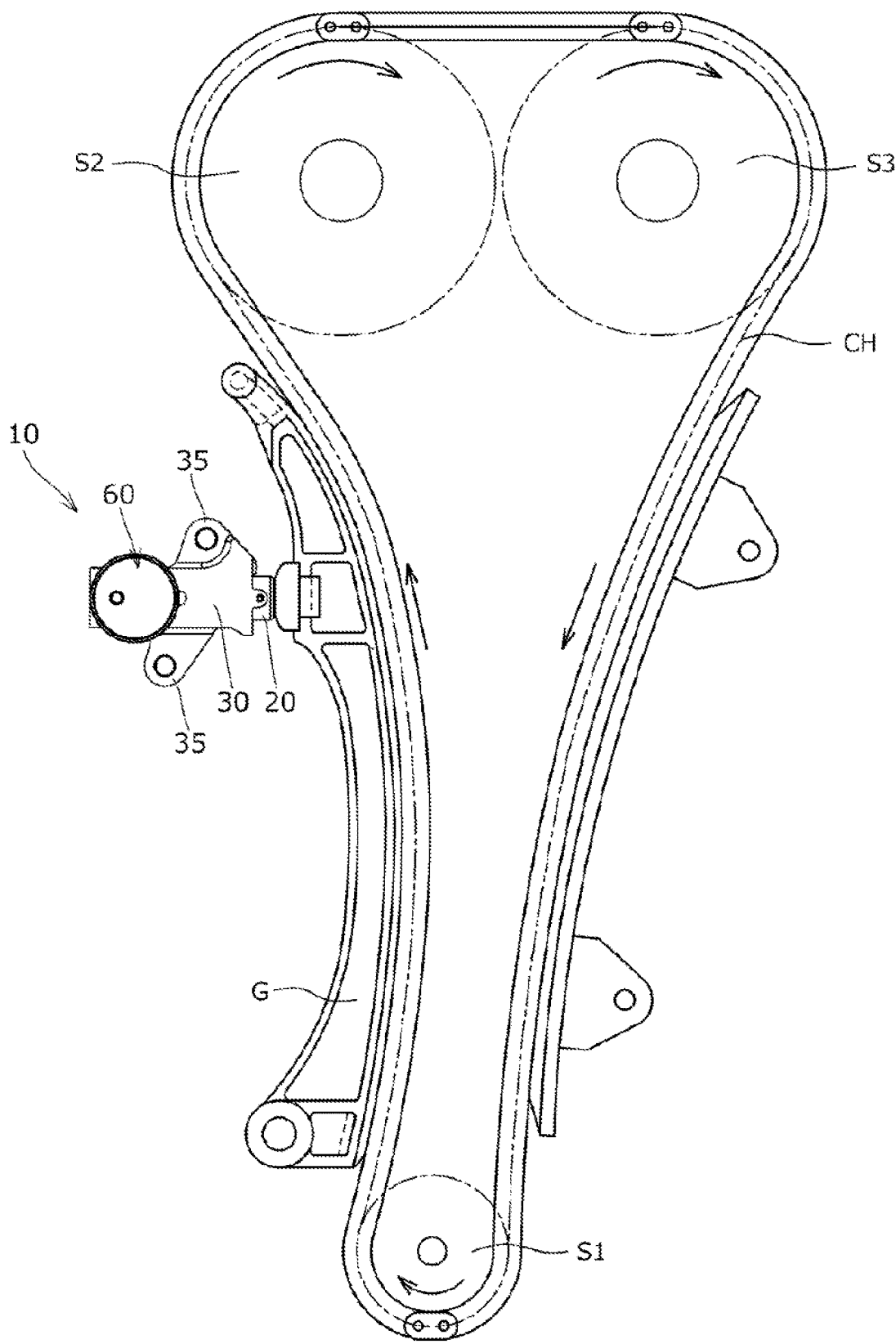
FIG. 1 is an illustrative view showing a timing system in which a tensioner according to a first embodiment of the present invention is embedded.

First, the tensioner 10 is embedded in a chain transmission device used for a timing system in an automobile engine or the like. As shown in FIG. 1, the tensioner 10 is attached to an engine block (not shown) to give an appropriate tension, via a tensioner lever G, to the loose side of a transmission chain CH wound around a plurality of sprockets S1 to S3 and inhibit vibration from occurring during driving.

Figure 4:
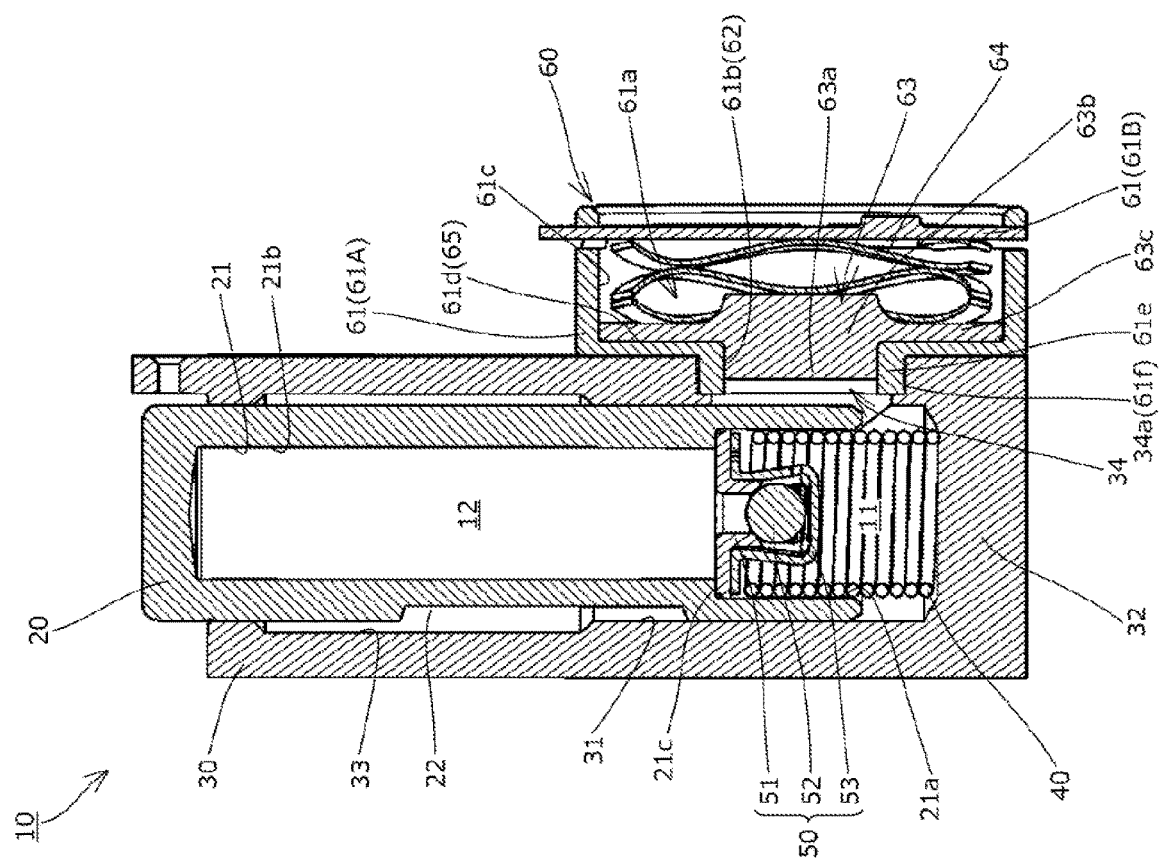
FIG. 4 is a cross-sectional view showing the tensioner in the first embodiment.

As shown in FIG. 4, the tensioner 10 includes a plunger 20 having a cylindrical plunger hole 21 that is rearwardly opened, a housing 30 having a plunger container hole 31 that is forwardly opened to contain the plunger 20, a main spring (main biasing unit) 40 extensively contained in an oil pressurizing chamber 11 formed between the plunger 20 and the plunger container hole 31 to forwardly bias the plunger 20, a check valve 50 which partitions the space between the housing 30 and the plunger 20 into a front oil storage chamber 12 and the rear oil pressuring chamber 11 to allow oil to flow into the oil pressurizing chamber 11 and inhibit the oil from flowing backward into the oil storage chamber 12, an oil supply path which supplies oil from the outside of the housing 30 to the oil storage chamber 12, and a pressure adjustment unit 60 which adjusts an oil pressure in the oil pressurizing chamber 11.

The following will describe the individual components of the tensioner 10 on the basis of the drawings.

First, as shown in FIG. 4, the plunger 20 is formed of a metal such as iron and inserted in the plunger container hole 31 to be forwardly and backwardly movable in a front-rear direction.

As shown in FIG. 4, the plunger hole 21 has a rear larger-diameter hole 21a, a front smaller-diameter hole 21b formed on the front side of the larger-diameter hole 21a to be coaxial and continuous thereto, and a stepped section 21c formed between the larger-diameter hole 21a and the smaller-diameter hole 21b.

In the larger-diameter hole 21a of the plunger hole 21, the check valve 50 is disposed. The stepped section 21c of the plunger hole 21 functions as a portion which restricts the movement of the check valve 50 toward the oil storage chamber 12 (in a forward direction).

The plunger 20 also has a plunger through hole (not shown) formed to extend from the outer peripheral surface of the plunger 20 and reach the inner peripheral surface of the smaller-diameter hole 21b (the oil storage chamber 12).

The plunger 20 also has a communication adjustment groove 22 formed in the outer peripheral surface thereof.

Figure 2:
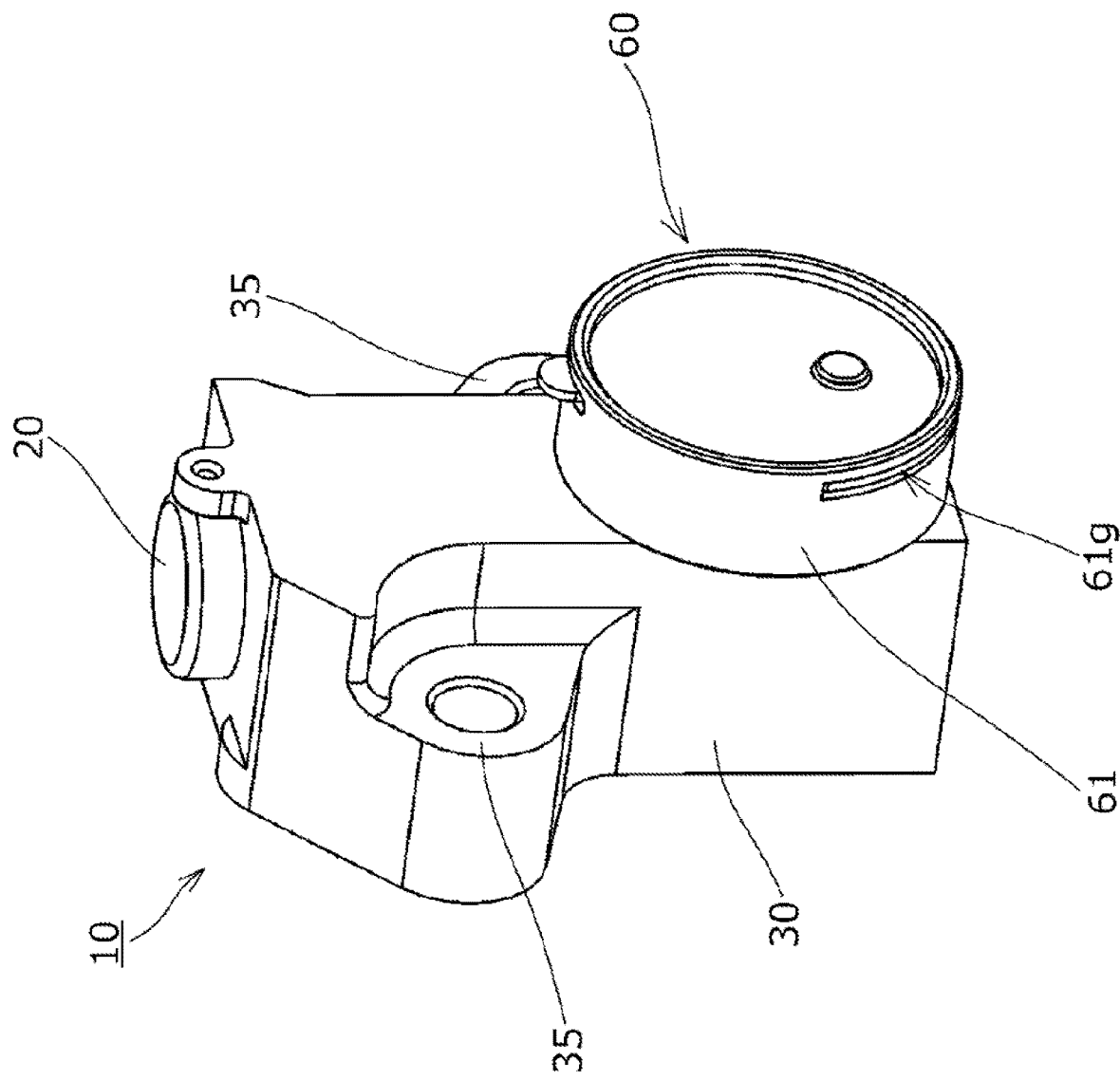
FIG. 2 is a perspective view showing the tensioner in the first embodiment.

The housing 30 is formed of a metal such as iron. As shown in FIGS. 2 and 4, the housing 30 has the cylindrical plunger container hole 31, a bottom section 32 formed on the rear side thereof, a communication adjustment groove 33 annularly formed in the inner peripheral surface of the plunger container hole 31, a housing oil supply hole (not shown) extending from the outside of the housing 30 to the inner peripheral surface of the plunger container hole 31 through the housing 30 to supply oil to the communication adjustment groove 33, a unit opening 34 formed in the rear part of the housing 30 (the plunger container hole 31) to extend from the plunger container hole 31 to the outer wall of the housing 30 through the housing 30, and attachment sections 35 for fixing the housing 30 to the engine block.

As shown in FIG. 4, the oil supply path that supplies oil from the outside of the housing 30 to the oil storage chamber 12 includes the plunger through hole (not shown) formed in the plunger 20, the housing oil supply hole (not shown) formed in the housing 30, and the communication adjustment grooves 22 and 33.

Note that the communication adjustment grooves 22 and 33 described above may be formed appropriately in at least one of the outer peripheral surface of the plunger 20 and the inner peripheral surface of the plunger container hole 31.

The housing oil supply hole (not shown) formed in the housing 30 is connected to an oil pump (not shown) provided in an engine (not shown) when the tensioner 10 is attached to the engine block (not shown).

The main spring 40 is made of a metal or the like. As shown in FIG. 4, the main spring 40 is extensively contained in the oil pressurizing chamber 11. Specifically, the main spring 40 is configured such that one end thereof comes in contact with the bottom section 32 of the housing 30, while the other end thereof is seated on a retainer 53 of the check valve 50.

As shown in FIG. 4, the main spring 40 forwardly biases the plunger 20, while pressing the check valve 50 (the retainer 53 and a sheet member 51) against the stepped section 21c, thereby fixing the check valve 50.

As shown in FIG. 4, the check valve 50 includes the sheet member 51, a valve member 52 capable of coming into close contact with an oil flow path in the sheet member 51, and the retainer 53 which guides the valve member 52.

Note that any specific configuration of the check valve 50 may be adopted as long as the check valve 50 allows oil to flow into the oil pressurizing chamber 11 and inhibits oil inhibited from flowing backward into the oil storage chamber 12. For example, a spring which biases the valve member 52 toward the sheet member 51 may also be disposed between the valve member 52 and the retainer 53.

Each of the constituent members of the check valve 50 is formed of a metal, a synthetic resin, or the like.

Figure 3:
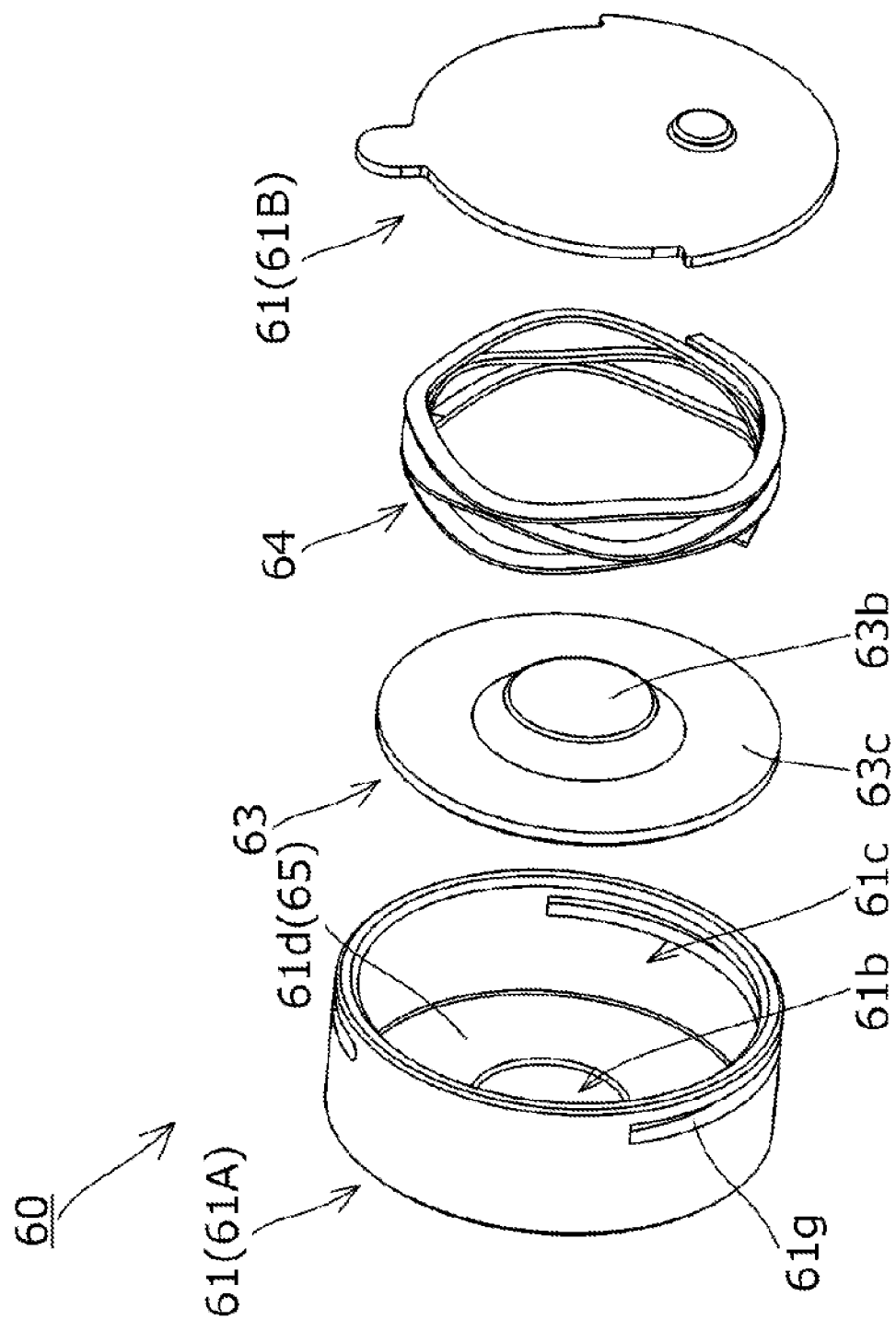
FIG. 3 is an exploded perspective view showing a pressure adjustment unit in the first embodiment.

The pressure adjustment unit 60 adjusts the oil pressure in the oil pressurizing chamber 11. As shown in FIGS. 3 and 4, the pressure adjustment unit 60 includes a unit case 61 attached to the housing 30, a cylinder section 62 having a cylindrical inner peripheral surface, a moving member 63 disposed in a case inner space 61a of the unit case 61 to be capable of moving closer to and farther away from the oil pressurizing chamber 11, a pressure adjustment spring (pressure adjustment biasing unit) 64 which biases the moving member 63 toward the oil pressurizing chamber 11, and a movement restricting section 65 which restricts movement of the moving member 63 toward the oil pressurizing chamber 11.

The unit case 61 is formed of a metal such as aluminum or a synthetic resin and attached to be detachably (or undetachably) fixed to the housing 30. In the present embodiment, as shown in FIG. 4, the unit case 61 is attached to the housing 30 by screwing a screw section 61f formed in the outer peripheral surface of a protruding section 61e described later into a screw section 34a formed in the inner peripheral surface of the unit opening 34. Note that the attachment of the unit case 61 to the housing 30 may be performed by any method such as by press-fitting a portion of the unit case 61 into the housing 30.

As shown in FIGS. 3 and 4, the unit case 61 internally has the case inner space 61a.

The case inner space 61a communicates with the oil pressurizing chamber 11 through the unit opening 34 in the state where the unit case 61 is attached to the housing 30.

The case inner space 61a has a cylindrical smaller-diameter hole 61b communicating with the oil pressurizing chamber 11 (the plunger container hole 31), a cylindrical larger-diameter hole 61c formed to be coaxial and continuous to the smaller-diameter hole 61b and opened to the outside of the housing 30, and a stepped section 61d formed between the smaller-diameter hole 61b and the larger-diameter hole 61c.

As shown in FIGS. 3 and 4, the unit case 61 has the protruding section 61e inserted in the unit opening 34 and the screw section 61f formed in the outer peripheral surface of the protruding section 61e.

Note that, in the present embodiment, as shown in FIGS. 3 and 4, the unit case 61 includes a first case component 61A made of a metal such as aluminum, a synthetic resin, or the like and a second case component 61B made of a metal such as aluminum, a synthetic resin, or the like and attached to the first case component 61A.

However, a specific form of the unit case 61 may also be such that the unit case 61 is configured as a single component or the unit case 61 is configured to include three or more components.

When the unit case 61 is configured to include a plurality of case components, the individual case components may be assembled together in any form. In the example shown in FIGS. 3 and 4, in the first case component 61A, the cylinder section 62 and the movement restricting section 65 are formed, but any functional sharing may be carried out among the plurality of case components.

Note that, in the present embodiment, as shown in FIGS. 3 and 4, the second case component 61B is configured as a plate-like member which inhibits the pressure adjustment spring 64 and the moving member 63 each disposed in the first case component 61A from coming off from the opening of the first case component 61A.

The second case component 61B is attached to the first case component 61A by being inserted into the first case component 61A from an insertion slit 61g formed therein.

The cylinder section 62 is a portion in which the moving member 63 (a piston section 63a described later) is disposed to be slidable in the front-rear direction.

As shown in FIG. 4, at least one portion of the inner wall of the case inner space 61a (which is the inner peripheral surface of the smaller-diameter hole 61b of the case inner space 61a in the present embodiment) functions as the cylinder section 62.

The moving member 63 is formed of a metal such as aluminum, a synthetic resin, or the like. As shown in FIGS. 3 and 4, the moving member 63 includes a generally cylindrical main body section 63b and a disc-shaped flange section 63c radially outwardly protruding from the outer peripheral surface of the main body section 63*b* and having a diameter larger than that of the main body section 63*b*.

Of the main body section 63*b*, the portion closer to the oil pressurizing chamber 11 than the flange section 63*c* functions as the piston section 63*a* slidably disposed in the cylinder section 62.

The pressure adjustment spring 64 is formed of a metal such as aluminum and configured as a known wave spring, as shown in FIGS. 3 and 4. The pressure adjustment spring 64 is disposed in the larger-diameter hole 61*c* to have one end in contact with the moving member 63 (the flange section 63*c*) and the other end in contact with the unit case 61 (the second case component 61B).

The diameter difference between the cylindrical piston outer peripheral surface of the piston section 63*a* and the cylindrical cylinder inner peripheral surface of the cylinder section 62 is so small as to allow the space between the cylinder inner peripheral surface and the piston outer peripheral surface to be held in a liquid tight state.

Accordingly, at any position between the position where the moving member 63 is closest to the oil pressurizing chamber 11 as a result of moving and the position where the moving member 63 is most distant from the oil pressurizing chamber 11, the gap between the piston outer peripheral surface and the cylinder inner peripheral surface is held in the liquid tight state. This can inhibit the oil in the oil pressurizing chamber 11 from flowing out of the oil pressurizing chamber 11 through the space between the cylinder inner peripheral surface and the piston outer peripheral surface.

The position where the moving member 63 is closest to the oil pressurizing chamber 11 as a result of moving is the position where the stepped section 61*d* of the case inner space 61*a* comes into contact with the flange section 63*c* of the moving member 63. Thus, in the present embodiment, the stepped section 61*d* functions as the movement restricting section 65 which restricts the movement of the moving member 63 toward the oil pressurizing chamber 11.

In the present embodiment, the position where the moving member 63 is most distant from the oil pressurizing chamber 11 is determined by the relationship between the strength of the biasing force of the pressure adjustment spring 64 and the oil pressure in the oil pressurizing chamber 11. However, it may also be possible to provide, in the unit case 61, a second movement restricting section which comes into contact with the moving member 63 to restrict the movement of the moving member 63 in a direction away from the oil pressurizing chamber 11. Note that, when the second movement restricting section is not provided as in the present embodiment, the pressure adjustment spring 64 can be designed to have a large diameter.

Also, in the present embodiment, between the inner peripheral surface of the larger-diameter hole 61*c* and the outer peripheral surface of the flange section 63*c*, a rather small gap is formed. However, the size of the gap may also be set such that the gap between the inner peripheral surface of the larger-diameter hole 61*c* and the outer peripheral surface of the flange section 63*c* is held in a liquid tight state.

In the tensioner 10 thus obtained in the present embodiment, first, in normal times, as shown in FIG. 4, the moving member 63 is biased by the pressure adjustment spring 64 toward the oil pressurizing chamber 11 to provide the state where the moving member 63 (the flange section 63*c*) is pressed against the movement restricting section 65 (the stepped section 61*d* of the case inner space 61*a*).

Note that, in the state where the flange section 63*c* is pressed against the stepped section 61*d*, the flange section 63*c* and the stepped section 61*d* are in close contact with each other.

Then, when the oil pressure in the oil pressurizing chamber 11 exceeds a given value (when the increased oil pressure in the oil pressurizing chamber 11 exceeds the biasing force of the pressure adjustment spring 64), the moving member 63 is pressed by the oil pressure in the oil pressurizing chamber 11 to move in the direction away from the oil pressurizing chamber 11 and increase the capacity of the oil pressurizing chamber 11 in accordance with an amount of the movement of the moving member 63. This can gradually reduce the pressing force of the plunger 20 exerted on the transmission chain CH and therefore stabilize the respective pressing forces of the oil pressure in the oil pressurizing chamber 11 and the pressing force of the plunger 20.

Note that, as shown in FIG. 4, at any position between the position where the moving member 63 is closest to the oil pressurizing chamber 11 as a result of moving (position where the movement thereof is restricted by the movement restricting section 65) and the position where the moving member 63 is most distant from the oil pressurizing chamber 11, the gap between the cylinder section 62 and the moving member 63 is held in a liquid tight state. Specifically, the tensioner 10 is configured such that the gap between the cylinder inner peripheral surface of the cylinder section 62 and the piston outer peripheral surface of the piston section 63*a* is held in the liquid tight state.

Next, a description will be given of the tensioner 10 according to a second embodiment of the present invention on the basis of FIG. 5. In the second embodiment, a configuration of the tensioner 10 has a portion which is exactly the same as that of the configuration in the first embodiment described above. Accordingly, the description of the configuration except for a different portion thereof is omitted.

First, in the second embodiment, unlike in the first embodiment, the oil storage chamber 12 is not provided. In the bottom section 32 of the housing 30, an oil supply hole 36 for supplying oil from the outside to the oil pressurizing chamber 11 is formed. In addition, between the oil pressurizing chamber 11 and the oil supply hole 36, a check valve unit 70 is disposed to allow oil to flow from the outside into the oil pressurizing chamber 11 through the oil supply hole 36 and prevent oil from flowing out from the oil supply hole 36.

Figure 5:
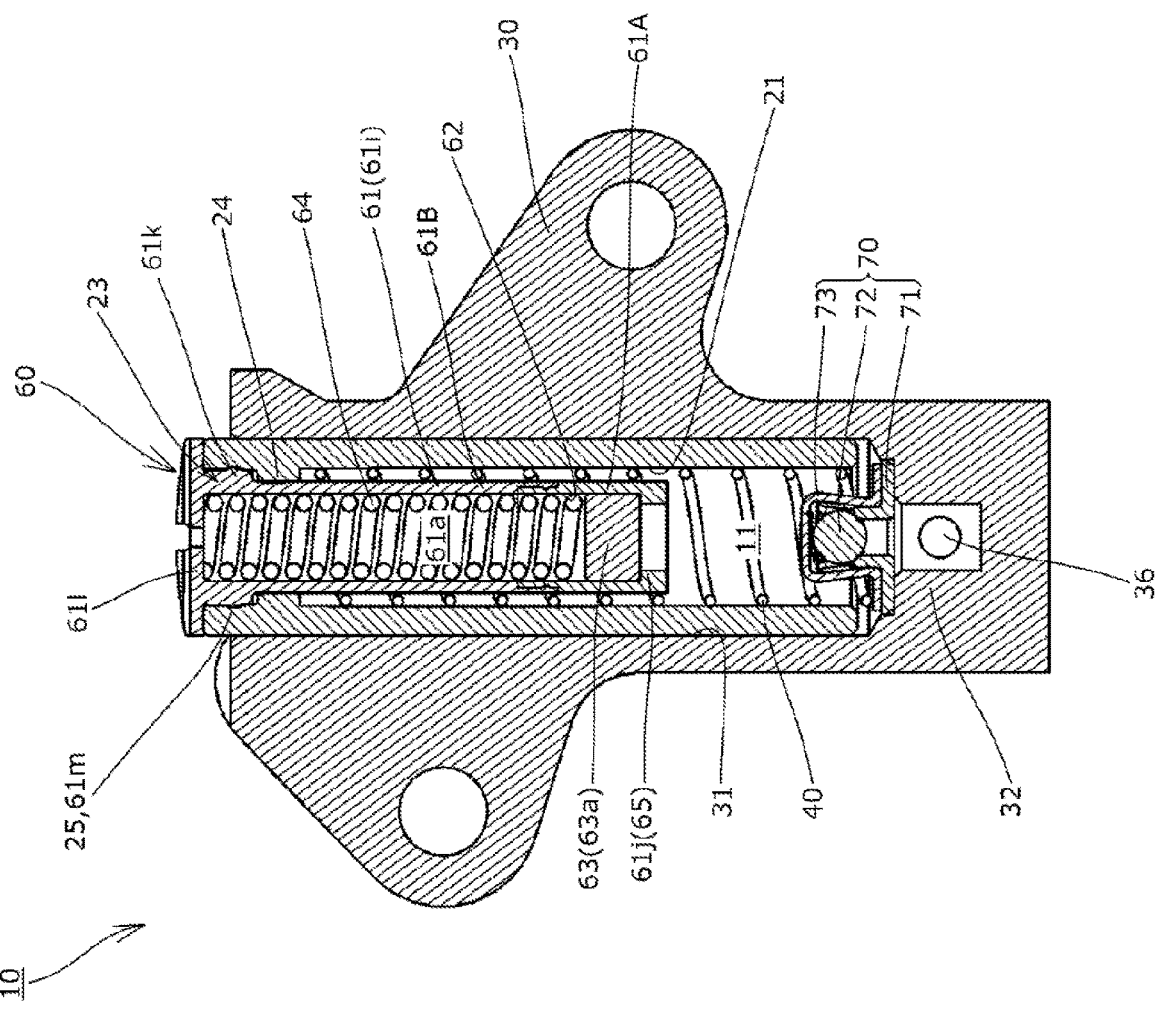
FIG. 5 is a cross-sectional view showing a tensioner in a second embodiment.
Figure 6:
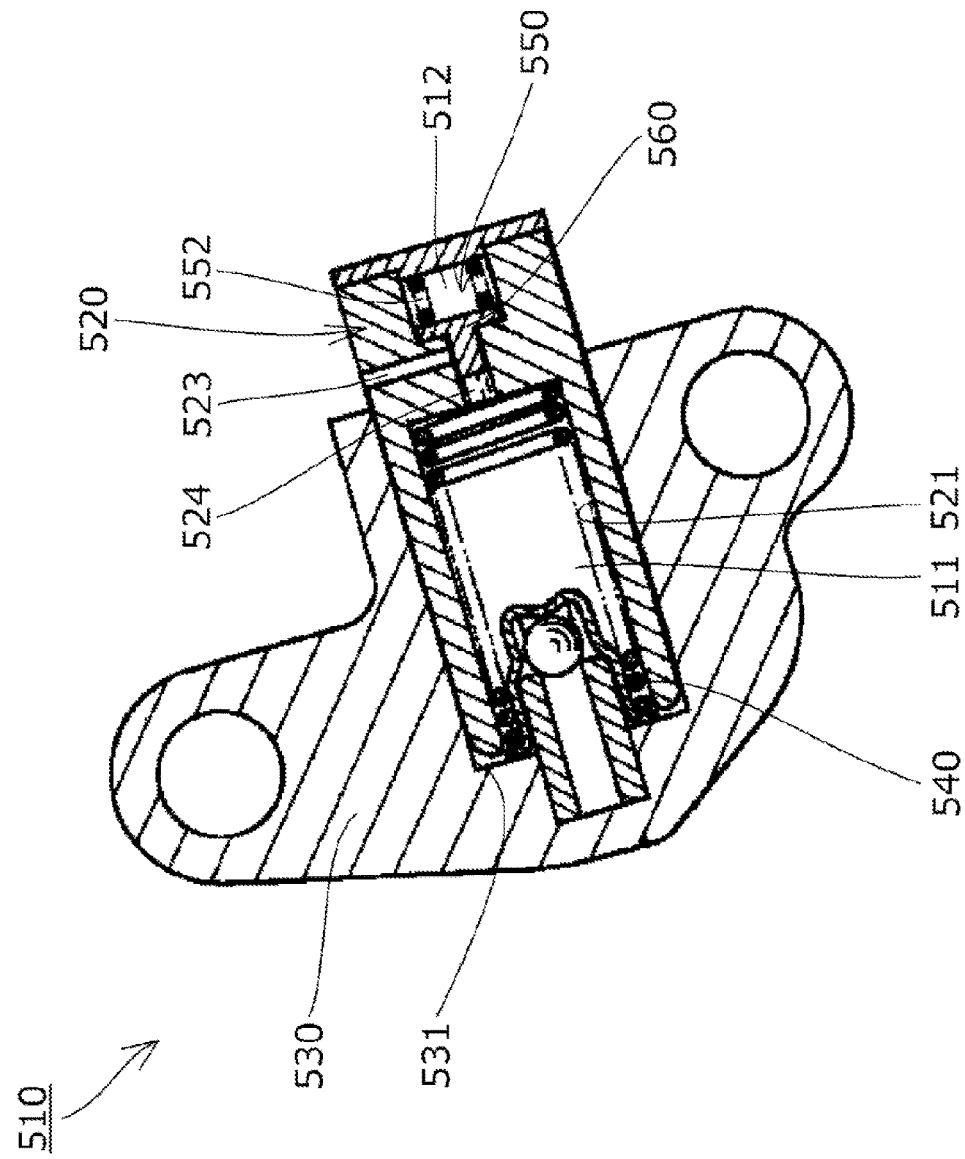
FIG. 6 is a cross-sectional view showing a related-art tensioner.

As shown in FIG. 5, the check valve unit 70 includes a sheet member 71 disposed in close contact with the front surface of the bottom section 32 of the housing 30, a spherical valve member 72 seated on the sheet member 71 to be able to come into close contact therewith, and a retainer 73 disposed in front of the valve member 72 to restrict the movement of the valve member 72.

Note that any specific configuration of the check valve unit 70 may be adopted as long as the check valve unit 70 allows oil to flow into the oil pressurizing chamber 11 and prevents oil from flowing out of the oil pressurizing chamber 11. For example, a spring which biases the valve member 72 toward the sheet member 71 may also be disposed between the valve member 72 and the retainer 73.

The check valve unit 70 is pressed against the front surface of the bottom section 32 of the housing 30 by the main spring 40.

Each of the constituent members of the check valve unit 70 is formed of a metal, a synthetic resin, or the like.

Also, in the second embodiment, as shown in FIG. 5, in the bottom section (front end section) of the plunger 20, a unit opening 23 is formed to extend from the plunger hole 21 to the outer wall of the plunger 20 through the plunger 20.

In the vicinity of the front end of the plunger 20, a convex section 24 is formed to annularly protrude from the inner peripheral surface of the plunger hole 21 in a radially inward direction and restrict rearward movement of the unit case 61 relative to the plunger 20.

In the inner peripheral surface of the plunger hole 21 located on the front side of the convex section 24, a concave section 25 is formed by annularly concaving the inner peripheral surface of the plunger hole 21.

The main spring 40 is formed of a metal or the like. As shown in FIG. 5, the main spring 40 is extensively contained in the oil pressurizing chamber 11 to have one end in contact with the convex section 24 of the plunger 20 and the other end in contact with the retainer 73 of the check valve 70.

Next, a configuration of the pressure adjustment unit 60 in the second embodiment is as follows.

The pressure adjustment unit 60 adjusts the oil pressure in the oil pressurizing chamber 11. As shown in FIG. 5, the pressure adjustment unit 60 includes the unit case 61 attached to the plunger 20 with at least one portion thereof (which is one portion thereof in the present embodiment) being inserted in the plunger hole 21 from the unit opening 23, the cylinder section 62 having a cylindrical inner peripheral surface, the moving member 63 disposed in the case inner space 61a formed in the unit case 61 to be able to move closer to and farther away from the oil pressurizing chamber 11, the pressure adjustment spring 64 which biases the moving member 63 toward the oil pressurizing chamber 11, and the movement restricting section 65 which restricts the movement of the moving member 63 toward the oil pressurizing chamber 11.

The unit case 61 is formed of a metal such as aluminum or a synthetic resin and detachably (or undetachably) attached to the plunger 20 to be fixed (at least in the front-rear direction). In the present embodiment, as shown in FIG. 5, the unit case 61 is attached to the plunger 20 by inserting the unit case 61 from the unit opening 23 of the plunger 20 into the plunger hole 21 and fitting a projection 61m of the unit case 61 described later into the concave section 25 of the plunger 20 described later. The attachment of the unit case 61 to the plunger 20 may be performed by any method such as by press-fitting a portion of the unit case 61 into the plunger 20.

The unit case 61 is formed of a metal such as aluminum or a synthetic resin. As shown in FIG. 5, the unit case 61 includes a case main body 61i formed in a cylindrical shape, a movement restricting convex section 61j annularly protruding from the inner peripheral surface of the rear end of the case main body 61i in a radially inward direction, an annular convex section 61k formed to protrude, in the vicinity of the front end of the case main body 61i, from the outer peripheral surface of the case main body 61i in a radially outward direction and disposed on the front side of the convex section 24 of the plunger 20, and a bottom section 61l formed at the front end of the case main body 61i.

In the present embodiment, the inner space of the case main body 61i functions as the case inner space 61a communicating with the oil pressurizing chamber 11.

Also, at least one portion of the cylindrical inner peripheral surface of the case main body 61i functions as the cylinder section 62 in which the moving member 63 (the piston section 63a) is disposed to be slidable in the front-rear direction.

Also, the movement restricting convex section 61j functions as the movement restricting section 65 which restricts the movement of the moving member 63 toward the oil pressurizing chamber 11.

The case main body 61i has a portion disposed in the main spring 40.

Also, in the bottom section 61l, an outside relief hole is formed to provide communication between the case inner space 61a and the outside of the plunger 20. The outside relief hole need not necessarily be provided but, in terms of preventing the oil pressure in the case inner space 61a from being excessively increased and exhausting the air that has entered the oil pressurizing chamber 11 and the case inner space 61a to the outside thereof, the outside relief hole is preferably provided.

At the outer peripheral surface of the annular convex section 61k, the annular projection 61m is formed to be fitted into the concave section 25 formed in the plunger 20.

The outer peripheral portion of the bottom section 61l is disposed on the front side of the front end surface of the plunger 20 to restrict rearward movement of the unit case 61 relative to the plunger 20.

Note that, in the present embodiment, as shown in FIG. 5, the unit case 61 includes the first case component 61A made of a metal such as aluminum, a synthetic resin, or the like and the second case component 61B made of a metal such as aluminum, a synthetic resin, or the like and fitted into the first case component 61A to be attached thereto.

However, a specific form of the unit case 61 may also be such that the unit case 61 is configured as a single component or configured to include three or more components.

When the unit case 61 is configured to include a plurality of case components, the individual case components may be assembled together in any form. In the example shown in FIG. 5, in the first case component 61A, the movement restricting section 65 is formed, but any functional sharing may be carried out among the plurality of case components.

The moving member 63 is formed of a metal such as aluminum, a synthetic resin, or the like. As shown in FIG. 5, the moving member 63 is formed in a cylindrical shape.

In the present embodiment, the whole moving member 63 functions as the piston section 63a slidably disposed in the cylinder section 62. The moving member 63 (the piston section 63a) has a cylindrical piston outer peripheral surface.

The pressure adjustment spring 64 is formed of a metal such as aluminum. As shown in FIG. 5, the pressure adjustment spring 64 is formed as a coil spring and disposed to have one end in contact with the moving member 63 and the other end in contact with the bottom section 61l of the unit case 61.

While the embodiments of the present invention have been described in detail, the present invention is not limited to the foregoing embodiments. Various design changes can be made without departing from the present invention described in the claims. It may also be possible to arbitrarily combine the individual components of the plurality of embodiments described above to configure the tensioner 10.

For example, in the embodiments mentioned above, the description has been given on the assumption that the tensioner 10 is embedded in the timing system for an automobile engine. However, a specific use of the tensioner 10 is not limited thereto.

Also, in the embodiments mentioned above, the description has been given on the assumption that the tensioner 10 gives a tension to the transmission chain CH via the tensioner lever G. However, it may also be possible that the tensioner 10 directly performs the slidable guiding of the chain CH using the front end of the plunger 20 and gives a tension to the transmission chain CH.

The tensioner 10 may be applied not only to a transmission mechanism using the transmission chain CH, but also to a similar transmission mechanism using a belt, a rope, or the like. The tensioner 10 is usable in various industrial fields as long as the tensioner 10 is required to give a tension to an elongated material when in use.

The "liquid tight state" mentioned in the present specification is not limited to the state where oil is completely inhibited from flowing and implies also the state where only a small amount of oil flows.

In the embodiments mentioned above, the description has been given on the assumption that the pressure adjustment unit 60 is configured by slidably disposing the moving member (the piston section 63a) in the cylinder section 62 formed in the unit case 61 and holding the gap between the cylinder section 62 and the moving member 63 in the liquid tight state irrespective of the position of the moving member 63 (i.e., at any position between the position where the moving member 63 is closest to the oil pressurizing chamber 11 as a result of moving and the position where the moving member 63 is most distant from the oil pressurizing chamber 11). However, a specific form of the pressure adjustment unit 60 is not limited to the above. The pressure adjustment unit 60 may have any form as long as the moving member 63 is disposed in the case inner space 61a in the state where at least one portion of the moving member 63 can move closer to and farther away from the oil pressurizing chamber 11 and the gap between the moving member 63 (at least one portion thereof) and the inner wall (at least one portion) of the case inner space 61a is held in a liquid tight state. For example, it may also be possible to form at least one portion of the moving member 63 of an elastic material such as rubber and dispose the moving member 63 in the case inner space 61a such that a portion of the moving member 63 can move closer to and farther away from the oil pressurizing chamber 11.

In the embodiments mentioned above, the description has been given on the assumption that the gap between the cylinder inner peripheral surface and the piston outer peripheral surface is held in the liquid tight state by producing a slight difference between the respective radial dimensions of the cylinder inner peripheral surface and the piston outer peripheral surface of the piston section 63a. However, a method for holding the liquid tight state is not limited to the above. For example, it may also be possible to dispose a member for holding the liquid tight state, such as packing, between the cylinder inner peripheral surface and the piston outer peripheral surface.

What is claimed is:

1. A tensioner comprising:
a plunger having a plunger hole that is rearwardly opened;
a housing having a plunger container hole that is forwardly opened to contain the plunger;
a main biasing unit which forwardly biases the plunger; and
a pressure adjustment unit which adjusts an oil pressure in an oil pressurizing chamber, the oil pressurizing chamber being formed between the plunger and the plunger container hole, wherein
the pressure adjustment unit includes a unit case attached to the housing or the plunger and having a case inner space communicating with the oil pressurizing chamber, a moving member disposed in the case inner space to be capable of moving closer to and farther away from the oil pressurizing chamber, and a pressure adjustment biasing unit that biases the moving member toward the oil pressurizing chamber, and
a gap between an inner wall of the case inner space and the moving member is in a liquid tight state at any position between a position where the moving member is closest to the oil pressurizing chamber as a result of moving and a position where the moving member is most distant from the oil pressurizing chamber.

2. The tensioner according to claim 1, wherein
the unit case has a cylinder section formed as at least one portion of the inner wall of the case inner space,
the moving member has a piston section slidably disposed in the cylinder section, and
a gap between the cylinder section and the piston section is in the liquid tight state at any position between the position where the moving member is closest to the oil pressurizing chamber as a result of moving and the position where the moving member is most distant from the oil pressurizing chamber.

3. The tensioner according to claim 1, wherein the pressure adjustment unit has a movement restricting section which restricts movement of the moving member toward the oil pressurizing chamber.

4. The tensioner according to claim 1, wherein
the housing has a unit opening extending from the plunger container hole to an outer wall of the housing through the housing, and
the unit case is attached to the housing such that the case inner space communicates with the oil pressurizing chamber through the unit opening.

5. The tensioner according to claim 1, wherein
the plunger has a unit opening extending from the plunger hole to an outer wall of the plunger through the plunger, and
the unit case is attached to the plunger with at least one portion thereof being inserted in the plunger hole from the unit opening.

* * * * *